United States Patent [19]

Whittaker et al.

[11] Patent Number: 5,689,680

[45] Date of Patent: Nov. 18, 1997

[54] CACHE MEMORY SYSTEM AND METHOD FOR ACCESSING A COINCIDENT CACHE WITH A BIT-SLICED ARCHITECTURE

[75] Inventors: Bruce E. Whittaker, Mission Viejo; David M. Kalish, Laguno Niguel; Saul Barajas, Mission Viejo, all of Calif.

[73] Assignee: Unisys Corp., Blue Bell, Pa.

[21] Appl. No.: 92,408

[22] Filed: Jul. 15, 1993

[51] Int. Cl.[6] ............................ G06F 12/02; G06F 12/08; G06F 13/00

[52] U.S. Cl. ..................... 395/454; 364/DIG. 1; 364/243.41; 364/964.33; 364/943.92; 364/243.44; 365/189.02; 365/230.02; 395/447; 395/456; 395/481

[58] Field of Search ...................... 395/400, 425, 395/446, 456, 476, 458, 403, 454, 455, 405; 365/189.03, 230.04; 364/DIG. 1, 243.44, 964.33, 943.92

[56] References Cited

U.S. PATENT DOCUMENTS

| | | | |
|---|---|---|---|
| 4,378,591 | 3/1983 | Lemay | 395/425 |
| 4,381,541 | 4/1983 | Baumann, Jr. et al. | 395/455 |
| 4,432,055 | 2/1984 | Salas et al. | 395/405 |
| 4,445,172 | 4/1984 | Peter et al. | 395/403 |
| 4,695,943 | 9/1987 | Keeley et al. | 395/467 |
| 4,713,755 | 12/1987 | Worley, Jr. et al. | 395/425 |
| 4,724,518 | 2/1988 | Steps | 395/454 |
| 4,736,293 | 4/1988 | Patrick | 395/455 |
| 4,905,141 | 2/1990 | Breaza | 395/456 |
| 4,992,930 | 2/1991 | Gilfeather et al. | 395/448 |
| 5,095,424 | 3/1992 | Woffinden et al. | 395/425 |
| 5,168,560 | 12/1992 | Robinson | 395/425 |
| 5,243,701 | 9/1993 | Muramatsu et al. | 395/405 |
| 5,274,790 | 12/1993 | Suzuki | 395/460 |
| 5,319,768 | 6/1994 | Rastegar | 345/425 |
| 5,398,325 | 3/1995 | Chang et al. | 395/403 |
| 5,553,263 | 9/1996 | Kalish et al. | 395/454 |

Primary Examiner—Tod R. Swann
Assistant Examiner—Tuan U. Thai
Attorney, Agent, or Firm—J. McCormack

[57] ABSTRACT

A "bit-sliced" construction cache module dictates dual TAG RAM Structures and dual invalidation queues, yielding enhanced performance: putting half the TAG array in each of two cache arrays, and allowing each to handle only one-half of the possible address values. Preferably, one half-module handles ZERO least-significant bits and the other handles ONE least-significant bits. Processor operations and invalidation operations can be "overlapped", and even operate simultaneously.

3 Claims, 6 Drawing Sheets

CACHE MEMORY SYSTEM AND METHOD FOR ACCESSING A COINCIDENT CACHE WITH A BIT-SLICED ARCHITECTURE

This invention relates to the Cache Memory of a computer system, and especially to providing coincident, simultaneous operations (in invalidation queue structure for cache memory therein) by using a "bit-sliced" architecture.

BACKGROUND, FEATURES

FIG. 1 depicts a "multiple memory" structured computer system. In such a system, memory storage is distributed between several system modules. There is always a "main memory" plus there may be various cache memory modules associated with each of the processing elements in the system. This figure shows all the system modules interconnected over a "system bus." There may be, in such a system, additional system bus structures (the Unisys A-11 system provides dual system buses denoted as System Bus A and System Bus B).

FIG. 1 also indicates that the various cache modules provide a path for the respective processor for memory storage information. The cache itself is the first possible source (first choice) for a given piece of addressed information for its processor. If the cache does hold the specific address required by the processor, then a "cache hit" occurs and it sources the necessary data immediately to the processor. However, if the addressed word(s) is not contained within the cache, then it provides the path for the information to be supplied from main memory over the system bus(es).

In a computer system having more than one memory storage facility, a special data integrity challenge can occur. Any computer system having both a main-memory structure and cache-memory(s) is in such a situation (e.g. see multi-memory System I in FIG. 1, having Main Memory linked by system bus means to a number of Processors, 1, 2 ... N, each with an associated Cache Memory). The potential problem that should be faced is that of maintaining "data coherency," i.e., assuring that all copies of information (data) are identical for a given specific address (in all memory facilities). —a "data integrity" problem.

If computer processors only read data from the memories, this problem would never occur; but, then, little productive work would take place either. Real processors must also modify the values of data that is stored in the system's memories. This is usually referred to as "writing memory", or as doing an "overwrite" operation. Some systems provide for several types of write operations. No matter what varieties of write operations are used, the central problem of data coherency arises any time data in one of several memory facilities has been modified.

Most computer systems with cache memories maintain data integrity using an "Invalidation" scheme. This technique requires each cache-memory module to monitor (or spy-upon) the memory operations of all other processors in the system. When any memory "data write" operation is detected, then each of the cache-memories must plan for a potential invalidation operation within its own cache memory. An invalidation operation entails checking the contents of (its own) cache memory for the specific address of the write operation that was detected. If a local cache-memory module discovers that it indeed does contain this same address, it must then mark this address as no longer valid, ("suspect"), since some other processor is overwriting its previous value.

This invalidation process, itself, presents a problem for the cache memory module and its associated processor, since it uses cache memory resources. These resources are, of course, present to assist the processor in its work, but the invalidation process may make them "busy" and so hinder the processor from getting its regular work done.

It would be desirable therefore to remember the information necessary for a specific invalidation and execute the process at the least inconvenient time—such is an object hereof.

A second motivation for some sort of remembering device for invalidation data is that the "spying," or monitoring of bus activity, may involve numerous write conditions, and doing so very quickly lest one delay other processors in the system. Therefore, each spy, or cache, must remember all the possible invalidation information for execution at some later time. This we also propose here.

Such a novel "remembering mechanism," is described here—and, for the sake of this discussion, it is called an "INVALIDATION QUEUE" (IQ). The IQ queue structure must take-in, and hold, all pertinent information regarding all memory write operations in the system. It must then provide for the convenient unloading of this information for the invalidation process at the discretion of the local cache-memory module.

FIG. 2 gives a simple block diagram showing a processing element 2-1, a cache block 2-3 and an interface block 2-5 showing the interfaces to the system bus(es). Cache block 2-3 shows a few of the significant elements required for our cache design. These are:

(1) TAG RAM structure 2-3T which holds information as to which of all the possible memory addresses the cache presently contains.

(2) DATA RAM structure 2-3D which holds the actual data values corresponding to the addresses held in the TAG RAM. If a "hit" occurs, the proper data values are immediately driven from the DATA RAM back to processor 2-1.

(3) HIT LOGIC 2-3H to determine whether the required processor data is held in the cache and to drives the appropriate control signal(s) back to processor 2-1 indicating this. If a cache "miss" occurs, then this logic will trigger off the appropriate system bus cycles to retrieve the necessary data from main memory.

(4) INVALIDATION QUEUE block 2-3I to monitor all memory-write type operations on the system bus(es). It must compare all write operation addresses against those in the cache tag ram. If a write address is contained within the cache, it must be marked "invalid"—this is called "invalidating" a cache address.

From FIG. 2, one can infer two major tasks (duties) of the cache module: First, to service the processor for all "hit data". (Find Hits). This function must be accomplished as fast as possible. Each additional clock-cycle lost here significantly reduces the performance of the computer system.

The second major job of the cache is to maintain the integrity of all the data it holds. This task is accomplished by the "invalidation" process, initiated for all write operations on the system bus(es). This task must assure that for any given address value in all storage modules (within the system) the data is identical. If two storage devices ever have differing data for the same address, "data coherency" is lost and the system is in trouble.

These two major cache tasks must both use the same cache resource—namely the TAG RAM facility 2-3T. Each must access TAG RAM and quickly determine whether a given address is currently held within the cache.

Both tasks must also be performed virtually instantaneously when requested. To delay a quick response to the processor is to drastically reduce its performance. And, a delay in system bus invalidation may cause loss of system bus write information.

This invalidation task may use some sort of "queueing" structure to hold a certain number of possible invalidation addresses. However, even the queue must be emptied quickly or risk the mentioned problem.

The conflict between these two tasks (find Hits, invalidate) can be resolved, we believe, by any of the following three cache module implementations;

(1) Provide two separate TAG RAM facilities, one for the "processor-hit" function and the second for "invalidation". This will work; however, the TAG RAM is the most expensive part of the cache block, so workers prefer not to double its size. Additionally, this approach requires extensive logic to assure that the two TAG RAM are always completely and exactly identical to one other (i.e. that they always hold only the same exact addresses).

(2) Another way would be to build a special "dual-ported" TAG RAM structure. This is very expensive if one is to provide s structure large enough for realistic cache devices.

(3) A third approach is the subject of this disclosure, and provides a compromise between performance and hardware size/cost. This method uses a feature we call "BIT-SLICE-ABILITY," and allows processor servicing and system bus invalidations to proceed coincidently (simultaneously). This approach is a result of bit-slicing the cache implementation, and is derived at virtually no additional cost in added system hardware.

An object hereof is to address at least some of the foregoing problems and to provide at least some of the mentioned, and other, advantages.

BRIEF DESCRIPTION OF THE DRAWINGS

These and other features and advantages of the present invention will be appreciated by workers, and better understood by reference to the following detailed description of the present preferred embodiments—this being considered in conjunction with the accompanying drawings, wherein like reference symbols denote like elements.

DESCRIPTION OF PREFERRED EMBODIMENT

Exemplary Use

In considering the following details of the subject data queue embodiments, workers should understand that the salient examplary use-environment therefor is in the cache portion of the Central Processor board of the Unisys A-11, 411 mainframe computer. The methods and means discussed herein, will generally be understood as provided and operating according to present good practice as known in the art, except where otherwise specified. Likewise all materials, methods, devices and apparatus described will be understood as implemented by known expedients according to present good practice.

DETAILED DESCRIPTION OF PRINCIPAL EMBODIMENT

OVERVIEW

Figure 3:
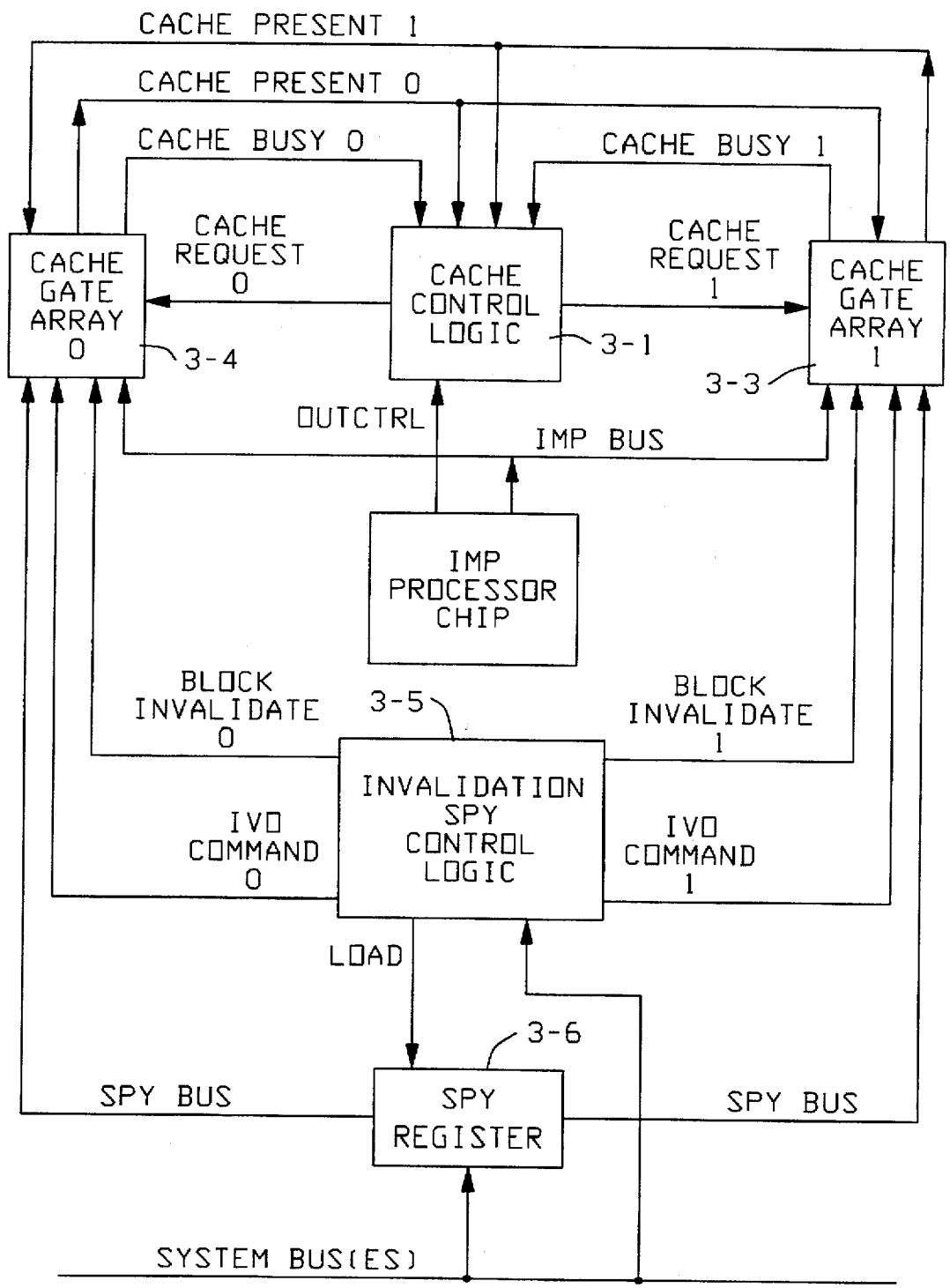
FIG. 3, a more detailed block diagram representation of the preferred cache module of FIG. 2.

FIG. 3 gives a preferred cache implementation according to this invention (in A11, 411). Here, the processing element is called "IMP," (e.g., Integral Main Processor) and interfaces with various parts of the cache module—which is here shown as split into several working blocks.

One cache module block is: "Cache Control Logic" block 3-1 which receives from the processor (IMP) the request for a memory operation. Block 3-1 also monitors the "busy" conditions of the cache resources—i.e. the TAG RAM facility. Based on this information, block 3-1 will generate a "Cache Request" signal, applied to a pair of Cache Gate Arrays 3-3, 3-4.

Another cache module block is the "Invalidation/Spy Control Logic" block 3-5 which receives address information from the system bus(es) via a "Spy Register(s)" 3-6.

Figure 1:
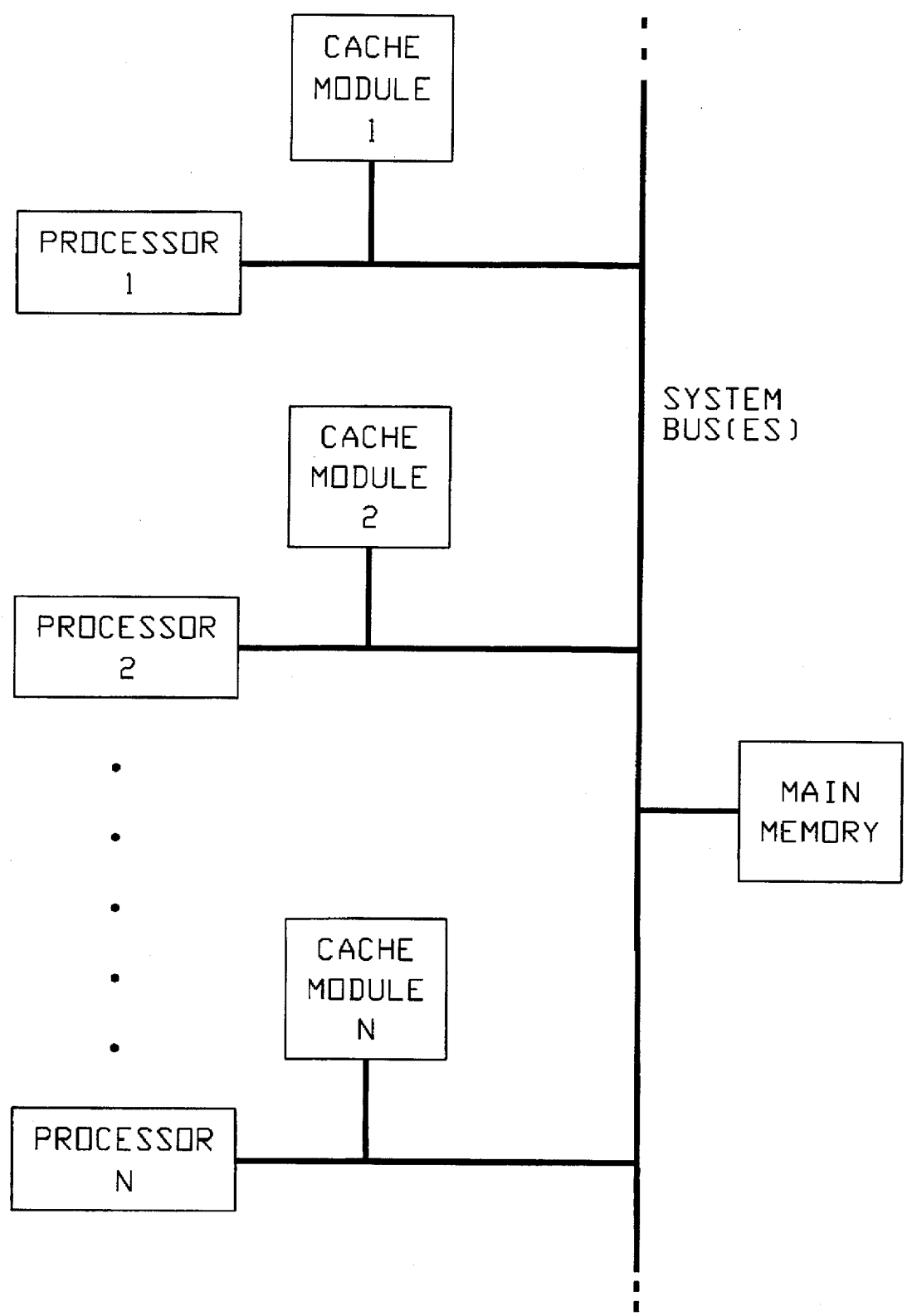
FIG. 1, a very simple functional representation of a multi-memory computer system.
Figure 2:
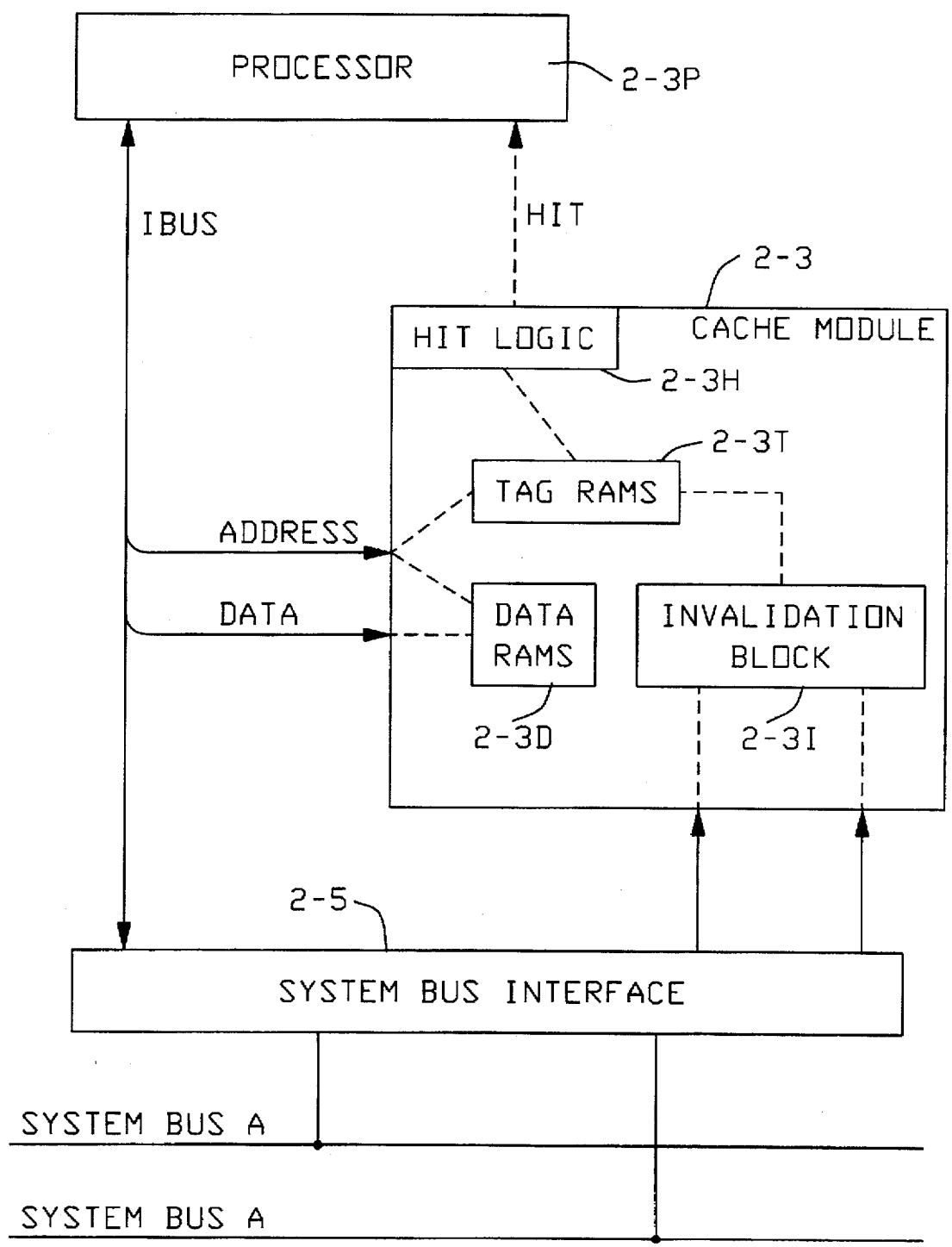
FIG. 2, a like but more specific representation of a preferred type of cache module for using an embodiment hereof.

The major blocks of the cache module are the two identical "Cache Gate Arrays" 3-3, 3-4. These are identical ASIC (e.g., Application specific Integrated Circuit) arrays which house the major portions of the cache module: TAG RAMs, Invalidation Queue, Hit Logic (e.g. as in FIG. 2).

These two identical blocks are the key to the special "bit-slice" feature of this invention. TAG RAMs are very large complex structures; to provide one large enough for the required cache (of this A11, 411) system, it was decided to split (halve) the TAG RAM and/or much of the cache structure. Each of the two gate arrays 3-3, 3-4 therefore houses a respective one-half of the (overall cache) structure. Thus, we say that the cache has been "bit-sliced", since array 3-3 (one-half of its hardware) does one-half the work and the other array 3-4 does the other half of the work. More specifically, Cache Gate Array 0 (3-4) handles all memory addresses where the least-significant-bit (lab) is "zero". Cache Gate Array 1 (3-3), in turn, handles all memory addresses where the lab is "one".

The two control blocks shown (3-1, 3-5) are external to these two ASIC arrays and are implemented in standard programmable array logic devices (PALs). These control blocks steer actions to the appropriate cache array and so accommodate this "bit-slicing", while allowing this the cache to execute two (load/unload) operations simultaneously. This operation "overlap", and its accompanying enhanced performance (transfer rate), come virtually "free" with the "bit-sliced" construction of the cache module.

With a computer system like the A11,411, the size of the cache needed (for contemplated performance) exceeded the size of a single ASIC array (per current technology, such a large single ASIC cache,—a 4k×4 way cache TAG—would unacceptably reduce production yield and raise costs, especially so if one also wanted Invalidation Queue hit logic (IQ) as part of such a single ASIC array). Thus, making the "cache-with IQ" from a pair of ASIC arrays was resorted-to; having thus "split" the cache array, we went further to "bit-slice" and give the mentioned operational "overlap", according to a salient feature hereof.

CACHE TAG RAM FACILITY OF THE INVENTION

Figure 4:
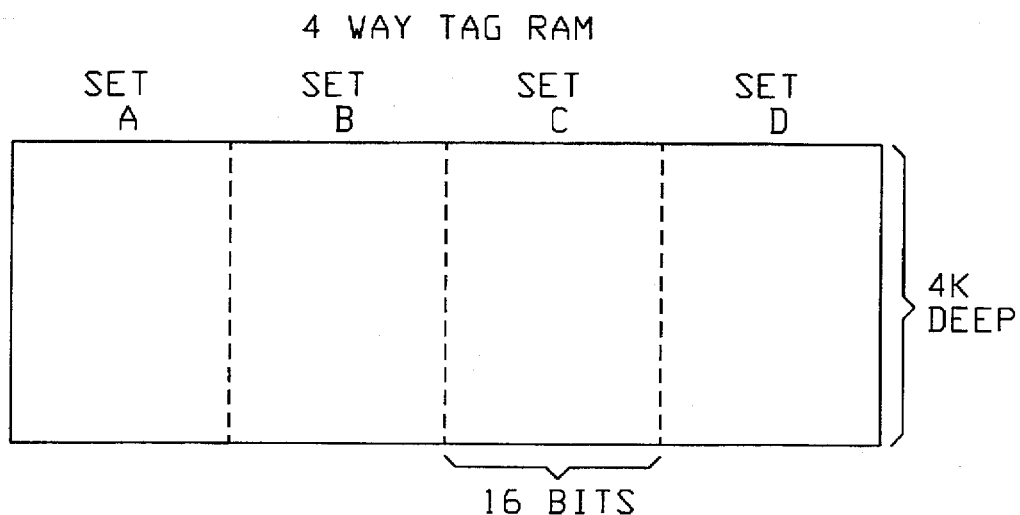
FIG. 4, a simplified schematic representation of a TAG RAM as in FIG. 3, with FIG. 5 giving a single set of a "bit-sliced" (split) version thereof, according to this invention.

FIG. 4 is a showing of the overall TAG RAM of this cache module without showing the actual "bit-sliced" construction. The TAG RAM is a 4-way (4-set) structure which is 4K (four thousand) words deep. Each set (or way) will be understood to be sixteen bits wide.

The actual construction of the TAG RAM array is, of course, split into two halves. Each half is 2K words deep. This splitting of the array is necessary to build a cache of sufficient size for the required performance, while yet implementing it within ASIC gate arrays.

Figure 5:
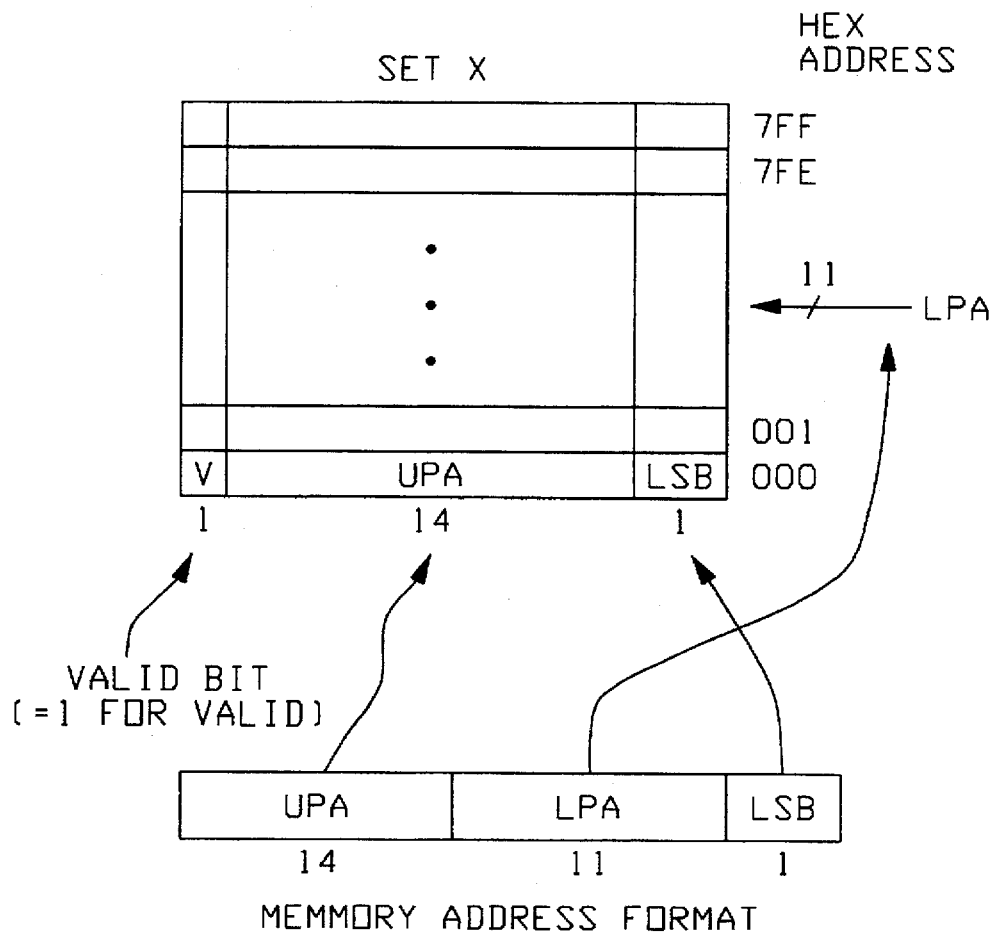

FIG. 5 represents a "single set" of the bit-sliced TAG RAM (one of the four in FIG. 4). FIG. 5 also shows how a full memory address (26 bits wide) is "mapped" into the cache TAG RAM structure. The "upper" 14 bits are called the "upper partial address" (UPA). This portion of the address is held in the actual TAG RAMs for later comparisons. Each word location of the TAG provides two one-bit fields. The first is called the "valid bit" which, when set to ONE, indicates that the current UPA is "valid" in the cache. The second bit field holds the lowest bit of the memory address, i.e. the least-significant-bit (LSB). Eleven bits (of the memory address) made-up of these lower bits is called the "lower partial address" (LPA). This is used to address into the TAG RAM array.

Figure 6:
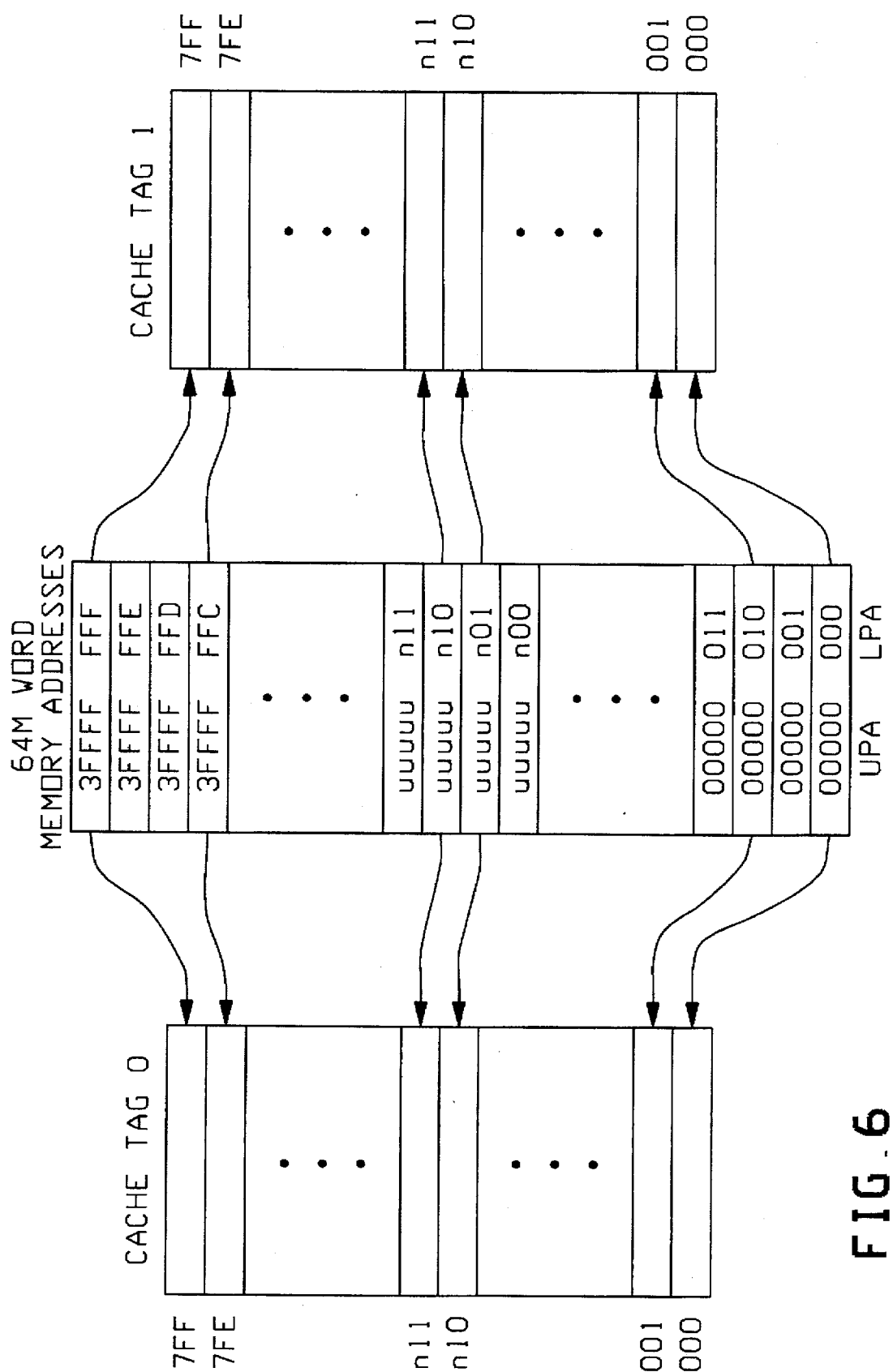
FIG. 6 shows address mapping for both halves of such a split TAG RAM.

FIG. 6 is a representation of both halves of the split TAG RAM structure for the cache module. Here, we indicate address-mapping from the full memory address (of a possible 64 million words) into the two 2K cache TAG RAMS. Workers will understand that the addresses are mapped as every-other-word into each of the two halves of the TAG, based upon the value of the LSB of the address. That is, if LSB=0, then gate array 0 (3-4, FIG. 3) gets the word; if LSB=1, then gate array 1 (3-3) gets the word.

This "bit-sliced" TAG RAM construction provides for the full 16K word cache size (made up of 2 times the 2K TAG RAMs times 4 Way each), while still being built in practical ASIC hardware. (e.g. reasonable cost).

CACHE PROCESSOR ACTIONS CONTROL

Referring back (e.g. to FIGS. 2, 3), it will be noted that the control of the cache TAG RAM accesses must provide for both "processor" (hit) activities and for "system bus invalidation" activities.

Each cache gate array (3-3, 3-4) and its TAG RAM facility must service both the "processor-hit" logic and the "invalidation" logic—both as quickly as possible.

Because of the "bit-slicing" of our TAG RAM construction, simultaneous (and coincident) operations are possible. This is preferably facilitated by the two control logic blocks 3-1, 3-5 in FIG. 3.

Processor cache actions (finding Hits) are triggered by signals labeled "Cache_Request_n." (i.e. Cache Request 0, 1; FIG. 3) Each of the cache gate arrays 3-3, 3-4, and their respective TAG RAMs, provide "busy" indicators to influence these cache operation "request" signals. There are two sources for these "busy" indicators—each of the two bit-sliced TAGs;—and each TAG provides two possible "busy" conditions as well—one for "processor-action-busy" conditions; the other for "invalidations busy" conditions. Therefore, the Cache Control Logic block (3-1) can receive any of four busy signals.

Additionally, two other control signals are received from the cache arrays 3-3, 3-4—i.e. a "Cache Present" indicator from each, indicating that the specific gate array has not been taken off-line due some error condition.

These "Cache Present" signals present an additional feature; a "degraded operation" (cache take-over) feature— whereby, if half the cache module malfunctions, the other half can pickup the efforts of the broken half and continue cache operations, albeit at a slightly degraded performance level.

Table I (below) gives the logic equations for the two Cache "Request" signals. The signal called, OUTCTRL, indicates that the processor has a memory operation to be handled, and initiates all processor actions for the cache.

TABLE I

| BIT-SLICED CACHE CONTROL EQUATIONS | | | | | | | | | | |
|---|---|---|---|---|---|---|---|---|---|---|
| CREQ0 | = | OUTCTRL | * | IBUS0/ | | | | | | |
| | | | * | CPRES0/ | * | CBUSY0/ | * | CBUSY1/ | * | CIVBUSY0/ |
| | + | OUTCTRL | * | CPRES0 | * | CBUSY0/ | * | CPRES1/ | * | CIVBUSY0/ |
| CREQ1 | = | OUTCTRL | * | IBUS0 | | | | | | |
| | | | * | CPRES1 | * | CBUSY1/ | * | CBUSY0 | * | CIVBUSY1/ |
| | + | OUTCTRL | * | CPRES1 | * | CBUSY1/ | * | CPRES0/ | * | CIVBUSY1/ |

*: logical AND function
+: logical OR function
/: logical NOT function

From the Table I equations, it can be seen that, if both of the cache gate arrays 3-3, 3-4 are present (CPRES0=1 and CPRES1=1), then the respective CACHE_REQUEST_n signal is issued based upon the current value of the lowest bit of the address bus, IBUS0.

It may also be seen that, when either of the TAGs is busy handling a processor operation, (indicated by the signals CBUSY0 and CBUSY1 being "true",) then neither Cache Request signal will be issued, and the processor must wait.

However, if a TAG is busy handling an invalidation operation, (indicated by the signals CIVBUSYn), then the other TAG RAM is available for a processor—cache operation, assuming that the least significant address bit, IBUS0, is at the appropriate value.

This logic facilitates a "coincident operation" feature of this invention, whereby an "invalidation" operation and a "processor-hit" operation can both be handled simultaneously. This feature will come into play approximately one-half the time, since it depends upon address bit 0 which can be either=0 or =1.

CACHE INVALIDATION ACTIONS CONTROL

Figure 7:
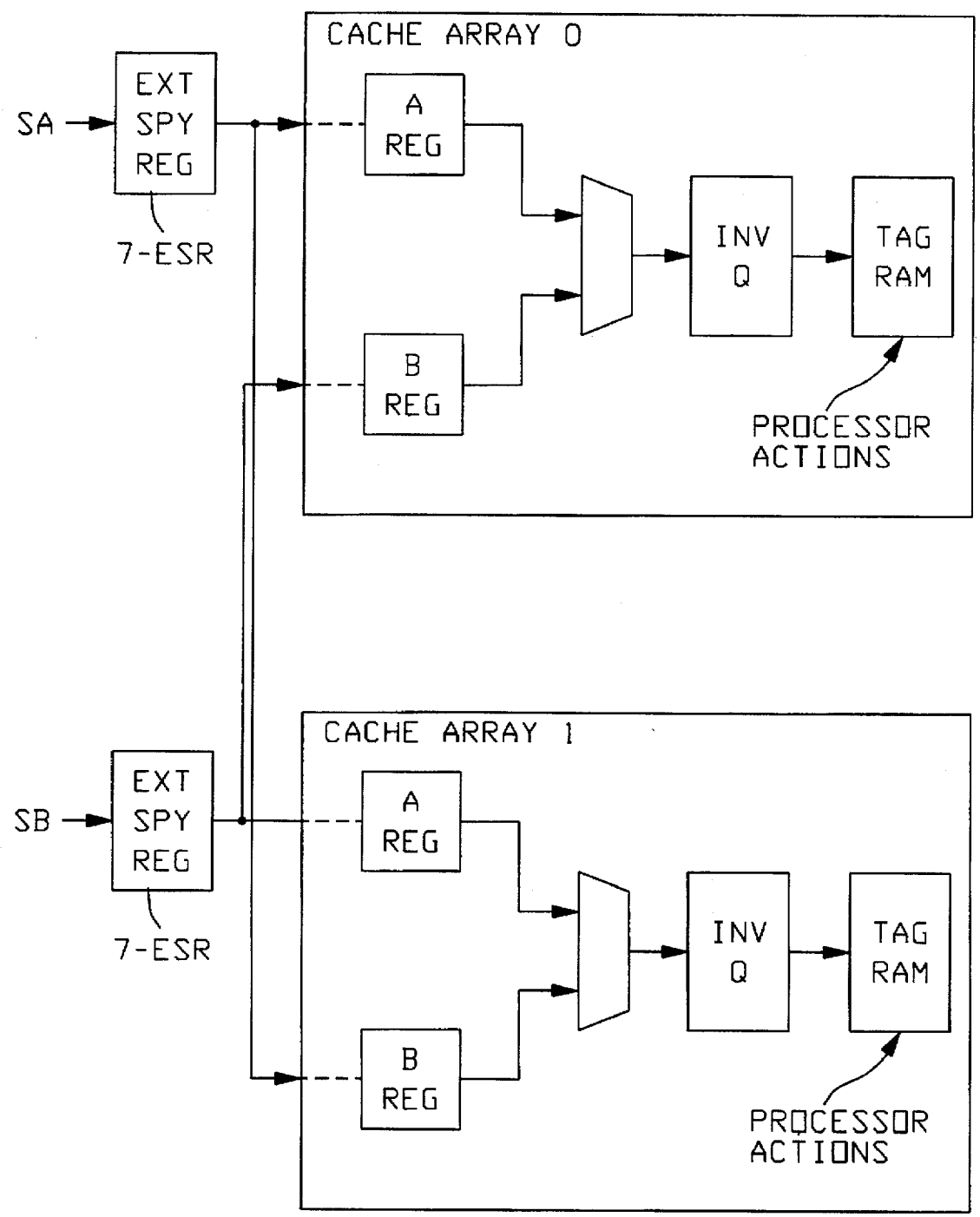
FIG. 7 shows in block diagram form, a preferred implementation of such bit-slice Invalidation Queue Logic (two cache arrays, bit-sliced).

FIG. 7 shows the "bit-sliced" invalidation Queue logic portion of the cache module according to a preferred implementation (for A-11, 411). Each of the two system buses, SA and SB, are first "registered" in 7-ESR, 7-ESR', externally to the cache (ASIC) gate arrays 3-3, 3-4. Then, each of these "spy address values" (from system bus write operations) are routed into both of the "bit-sliced" cache arrays 3-3', 3-4' (compare FIG. 3). Internally, this information is registered into a respective A and B register in each Array—the outputs of which are multiplexed into a respective (16-word-deep) "invalidation queue structure" (one in each Array).

When the cache is operating in the "non-degraded" condition, then both Arrays are in operation. In this (normal) mode, gate array 0 (3-4') will handle invalidations for addresses with the LSB=0. Gate array 1 (3-3') will handle invalidations for addresses with LSB=1. Thus, our "bit-slice" feature provides potentially for a "doubly-deep" invalidation queue. [can hold up to 32 addresses, depending on LSB].

As addresses are removed from an invalidation queue (one in each Array), cache array 0 (3-4') handles only addresses where the LSB=0, and cache array 1 (3-3') handles only addresses where the LSB=1. Again then, workers will see that this feature allows one Array to handle a "processor-hit" action, while the other array is simultaneously handling an "invalidation" action.

It follows from the above that, if no processor activity is currently using the cache TAG RAM resources, then our "bit-sliced" structure allows both arrays to be simultaneously processing "invalidations". Since, on the average, there are approximately seven (7) clock times between "processor/memory" type operations, then this "simultaneous" activity by the two bit-sliced arrays can do more "overhead work"—invalidation checking—"behind the processor's back" (i.e. without the processor being aware, or waiting on "Cache Busy"). This gives a significant performance enhancement, as workers will see.

Additionally, both the system bus external registers, both the internal invalidation registers in each array, and both the invalidation queues, can all continue to receive incoming invalidation information regardless of what the TAG is doing. This feature is important to reduce the possibility of slowing-down (retarding) system bus activity.

SUMMARY, REPRISE

The "bit-sliced" construction of our cache module provides dual TAG RAM structures and dual invalidation queues, yielding enhanced performance. By putting half the TAG array in each of two cache arrays, and allowing each to handle only one-half of the possible address values, "processor-hit" operations and "invalidation" operations can be "overlapped", and can even operate simultaneously.

This invention takes advantage of a cost-effective "splitting" of a large ASIC array, adapting it to a "bit-slicing" mode of division, to thereby facilitate "overlapping" storage access, such as to address processor-hits and invalidation in the I.Q. cache of a computer's central processor.

In turn, this means less likelihood that a processor need "wait" while a cache is busy, and greater likelihood that associated bus(es) are kept free.

Such a data queue which is bit-sliced is more efficient for storing address values (for possible invalidation, checking against cache TAG RAM—and can be advantageously used wherever a cache is desired (e.g. in a PC or a main frame).

The invention here disclosed gives a very advantageous, very flexible cache design; one that has been used very successfully in providing an Invalidation Cache (of Central Processing Module) for the Unisys A-11, 411, computer system.

It will be understood that the preferred embodiments described herein are only exemplary, and that the invention is capable of many modifications and variations in construction, arrangement and use without departing from the spirit of the invention.

Modifications of the invention are possible; for example the means and methods disclosed herein are also applicable to other like computer processor or—other like) contexts, as well as to other related data storage systems.

The above examples of possible variations of the present invention are merely illustrative. Accordingly, the present invention is to be considered as including all possible modifications and variations coming within the scope of the invention as defined by the appended claims.

What is claimed is:

1. A computer system with cache memory coupled to a system bus mean and adapted to provide coincident, simultaneous operations, said cache memory comprising a pair of like, separate, bit-sliced cache modules, each including a first and second IN-register means for storing spy address value from system bus write operation, and invalidation queue means fed, in multiplex fashion, by the outputs of said IN-register means and, in turn, feeding its output to a TAG RAM structure; each said TAG RAM structure being arranged and adapted to handle only on-half of the address values presented, and also arranged to enable processor operations and invalidation operations to be "overlapped", and to even operate simultaneously; the system comprises:

invalidation spy control logic means for monitoring said system bus of commands that potentially modify data stored in said cache modules;

cache gate array means for handling even and odd addresses;

cache control logic means utilized for distinguishing between said even and odd addresses, and directing cache requests to said cache gate array means;

said cache modules being input by first system bus means coupled via associated first spy register means, to both said first IN-registers means, and also input by second system bus mean, coupled, via associated second spy register means, to both said second IN-register means;

wherein said first spy register means and said second spy register means are for storing the potential invalidation address that is being loaded from said invalidation spy control logic means.

2. The system of claim 1 wherein said TAG RAM arrays and invalidation queue means comprise a pair of identical ASIC arrays.

3. A computer system with cache memory coupled to a system bus mean and adapted to provide coincident, simultaneous operations, said cache memory comprising a pair of like, separate, bit-sliced cache modules, each including a first and second IN-register means for storing spy address value from system bus write operation, and invalidation queue means fed, in multiplex fashion, by the outputs of said IN-register means and, in turn, feeding its output to a TAG RAM structure; each said TAG RAM structure being arranged and adapted to handle only on-half of the address values presented, and also arranged to enable processor operations and invalidation operations to be "overlapped", and to even operate simultaneously; the system comprises:

invalidation spy control logic means for monitoring said system bus of commands that potentially modify data stored in said cache modules;

cache gate array means for handling even and odd addresses;

cache control logic means utilized for distinguishing between said even and odd addresses, and directing cache requests to said cache gate array means;

said cache modules being input by first system bus means coupled via associated first spy register means, to both said first IN-registers means, and also input by second system bus mean, coupled, via associated second spy register means, to both said second IN-register means;

wherein said first spy register means and said second spy register means are for storing the potential invalidation address that is being loaded from said invalidation spy control logic means;

wherein said TAG RAM arrays and invalidation queue means comprise a pair of identical ASIC arrays.

* * * * *